United States Patent
Amano

(10) Patent No.: US 9,162,670 B2
(45) Date of Patent: Oct. 20, 2015

(54) VEHICLE AND METHOD OF CONTROLLING VEHICLE

(75) Inventor: Takashi Amano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/344,511

(22) PCT Filed: Sep. 27, 2011

(86) PCT No.: PCT/JP2011/071977
§ 371 (c)(1),
(2), (4) Date: Mar. 12, 2014

(87) PCT Pub. No.: WO2013/046312
PCT Pub. Date: Apr. 4, 2013

(65) Prior Publication Data
US 2014/0343777 A1 Nov. 20, 2014

(51) Int. Cl.
*B60L 9/00* (2006.01)
*B60W 20/00* (2006.01)
*B60K 6/445* (2007.10)
*B60W 10/06* (2006.01)
*B60W 10/08* (2006.01)
*B60W 30/18* (2012.01)

(52) U.S. Cl.
CPC ............. *B60W 20/10* (2013.01); *B60K 6/445* (2013.01); *B60W 10/06* (2013.01); *B60W 10/08* (2013.01); *B60W 20/00* (2013.01); *B60W 2030/1809* (2013.01); *B60W 2710/0666* (2013.01); *B60W 2710/105* (2013.01); *Y02T 10/6239* (2013.01); *Y10S 903/93* (2013.01)

(58) Field of Classification Search
USPC .......................................................... 701/22
See application file for complete search history.

(56) References Cited

U.S. PATENT DOCUMENTS 7,356,391 B2 * 4/2008 Matsuda et al. ................ 701/22
8,433,465 B2 * 4/2013 Yamazaki et al. .............. 701/22
(Continued)

FOREIGN PATENT DOCUMENTS

JP   A-50-90020      7/1975
JP   2000008902 A    1/2000
(Continued)

OTHER PUBLICATIONS

U.S. Appl. No. 14/344,413, filed Mar. 12, 2014 in the name of Amano.
(Continued)

*Primary Examiner* — Hussein A. Elchanti
(74) *Attorney, Agent, or Firm* — Oliff PLC

(57) ABSTRACT

A vehicle includes an engine and a motor generator generating driving power for running, and an ECU for controlling the engine and the motor generator. If user requested power and a vehicle speed are substantially constant when inertial running control is selected by a user, the ECU causes continuous driving power operation to be performed on the engine in which the engine is driven to continuously generate constant driving power, and causes driving power variation operation to be performed on the motor generator in which the motor generator is alternately switched between a low output state and a high output state in terms of driving power, thereby running the vehicle. As a result, energy efficiency during vehicle running can be improved.

15 Claims, 10 Drawing Sheets

(56) References Cited

U.S. PATENT DOCUMENTS

| | | | |
|---|---|---|---|
| 2004/0134697 A1* | 7/2004 | Kobayashi et al. | 180/65.2 |
| 2004/0154853 A1* | 8/2004 | Aikawa et al. | 180/242 |
| 2006/0048982 A1* | 3/2006 | Yamamoto et al. | 180/65.2 |
| 2009/0146615 A1 | 6/2009 | Zillmer et al. | |
| 2009/0211826 A1* | 8/2009 | Hashimoto | 180/65.275 |
| 2010/0087288 A1* | 4/2010 | Yamamoto | 477/3 |
| 2011/0192666 A1* | 8/2011 | Schmid et al. | 180/165 |

FOREIGN PATENT DOCUMENTS

| | | |
|---|---|---|
| JP | 2001157305 A | 6/2001 |
| JP | A-2007-187090 | 7/2007 |
| JP | A-2008-520485 | 6/2008 |
| JP | A-2009-298232 | 12/2009 |
| JP | A-2010-6309 | 1/2010 |

OTHER PUBLICATIONS

Jan. 16, 2015 Office Action issued in U.S. Appl. No. 14/344,413.
Jun. 8, 2015 Notice of Allowance issued in U.S. Appl. No. 14/344,413.

* cited by examiner

VEHICLE AND METHOD OF CONTROLLING VEHICLE

TECHNICAL FIELD

The present invention relates to vehicles and methods of controlling the vehicles, and more particularly to running control of a vehicle running with inertial force of the vehicle.

BACKGROUND ART

In recent years, vehicles incorporating a power storage device (such as a secondary battery or capacitor) and running with driving power generated from electric power stored in the power storage device have been receiving attention as environmentally friendly vehicles. Examples of such vehicles include an electric vehicle, a hybrid vehicle, and a fuel cell vehicle.

There is a need to improve energy efficiency of these vehicles by increasing gasoline mileage and electric mileage, so as to further reduce environmental loads.

Japanese National Patent Publication No. 2008-520485 (Patent Document 1) discloses a hybrid vehicle including an internal combustion engine and a motor generator, in which the motor generator is controlled, when in a generator mode, in such a manner that the motor generator alternates between a first interval during which the motor generator is driven to operate with a high output which is greater than an actual power consumption of a vehicle electrical system and a second interval during which the motor generator is switched off.

According to Japanese National Patent Publication No. 2008-520485 (Patent Document 1), when the motor generator operates as a generator, the motor generator is driven at an operating point of high efficiency in the first interval and the motor generator is stopped in the second interval. As a result, continuation of the operation of the motor generator with low efficiency during operation of electric power generation can be suppressed, thus improving energy efficiency of the vehicle during the operation of electric power generation.

Japanese Patent Laying-Open No. 2010-6309 (Patent Document 2) discloses a hybrid vehicle including an internal combustion engine and a motor generator, which is configured to alternate between running with driving power generated by the internal combustion engine and running in an inertial state in which the internal combustion engine is stopped. As a result, the internal combustion engine can be driven at an operating point of high efficiency, thus improving gasoline mileage.

CITATION LIST

Patent Documents

PTD 1: Japanese National Patent Publication No. 2008-520485
PTD 2: Japanese Patent Laying-Open No. 2010-6309
PTD 3: Japanese Patent Laying-Open No. 2009-298232
PTD 4: Japanese Patent Laying-Open No. 2007-187090

SUMMARY OF INVENTION

Technical Problem

In the configuration of Japanese National Patent Publication No. 2008-520485 (Patent Document 1) described above, however, driving and stopping of the motor generator is repeated when the motor generator generates electric power, rather than varying the driving power for running the vehicle.

In the configuration disclosed in Japanese Patent Laying-Open No. 2010-6309 (Patent Document 2), driving and stopping of an engine which is the internal combustion engine is repeated in the hybrid vehicle.

When driving and stopping of a driving source is repeated as described above, a loss may occur during a shift to (at the start of) a driven state from a stopped state.

The present invention has been made in order to solve such problems, and an object of the present invention is to improve energy efficiency during running of a vehicle capable of running with driving power from an engine and a motor generator.

Solution to Problem

A vehicle according to the present invention includes a first driving source and a second driving source generating driving power for running the vehicle, and a control device for controlling the first and second driving sources. The control device causes the vehicle to run while causing continuous driving power operation to be performed on the first driving source in which the first driving source is driven to continuously generate driving power, and causing driving power variation operation to be performed on the second driving source in which the second driving source is alternately switched between a first state where the second driving source generates driving power of a first level and a second state where the second driving source generates driving power of a level lower than the first level.

Preferably, the control device causes the driving power variation operation to be performed on the second driving source, when driving power requested by a user varies within a prescribed range.

Preferably, the control device causes the second driving source to be switched between the first and second states so as to maintain a speed of the vehicle within an acceptable range, while the driving power variation operation is performed on the second driving source.

Preferably, the control device causes the second driving source to be switched to the second state in response to an increase in the speed of the vehicle to an upper limit of the acceptable range, and causes the second driving source to be switched to the first state in response to a decrease in the speed of the vehicle to a lower limit of the acceptable range.

Preferably, a sum of the driving power generated by the first driving source and the driving power generated by the second driving source in the second state is set to be smaller than reference driving power of constant output capable of maintaining a speed of the vehicle. A sum of the driving power generated by the first driving source and the driving power generated by the second driving source in the first state is set to be larger than the reference driving power.

Preferably, the vehicle runs mainly with inertial force of the vehicle when the second driving source is in the second state.

Preferably, the driving power generated by the first driving source is set to predetermined driving power.

Preferably, the control device causes the second driving source to stop generating the driving power when the second driving source is in the second state.

Preferably, the first driving source is an engine, and the second driving source is a rotating electric machine.

Preferably, the first driving source is a rotating electric machine, and the second driving source is an engine.

Preferably, the vehicle further includes a power storage device for supplying electric power to the rotating electric machine. When a state of charge of the power storage device falls below a predetermined threshold value while the driving power variation operation is performed on the engine, the control device causes the continuous driving power operation of the rotating electric machine to be suspended, and causes operation to be performed in which the rotating electric machine is alternately switched between a third state where the rotating electric machine generates driving power of a second level and a fourth state where the rotating electric machine generates driving power of a level lower than the second level.

Preferably, when the state of charge of the power storage device falls below the predetermined threshold value while the driving power variation operation is performed on the engine, the control device causes the rotating electric machine to be switched to the third state during a period when the engine is in the first state, and causes the rotating electric machine to be switched to the fourth state during a period when the engine is in the second state.

Preferably, the control device causes the rotating electric machine to stop generating the driving power when the rotating electric machine is in the fourth state.

Preferably, each of the first and second driving sources is a rotating electric machine.

A method of controlling a vehicle according to the present invention is a method of controlling a vehicle including a first driving source and a second driving source. The control method includes the steps of driving the first driving source so as to generate continuous driving power, driving the second driving source so as to alternately switch the second driving source between a first state where the second driving source generates driving power of a first level and a second state where the second driving source generates driving power of a level lower than the first level, and running the vehicle with the driving power from the first and second driving sources.

Advantageous Effects of Invention

According to the present invention, energy efficiency can be improved during running of a vehicle capable of running with driving power from an engine and a motor generator.

DESCRIPTION OF EMBODIMENTS

Figure 1:
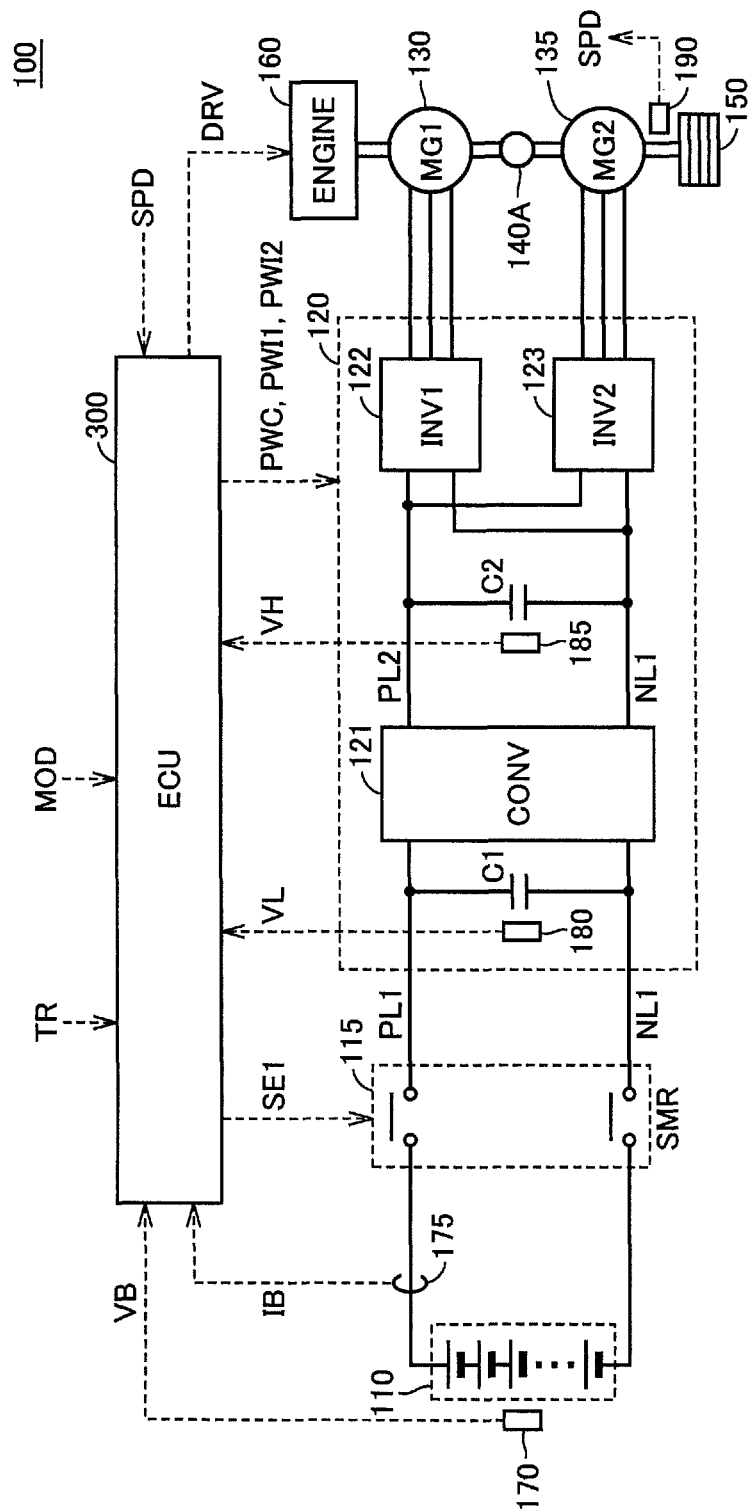
FIG. 1 is an overall block diagram of a hybrid vehicle according to an embodiment.

Embodiments of the present invention will be hereinafter described in detail with reference to the drawings, in which the same or corresponding elements are designated by the same reference characters, and the description thereof will not be repeated.

First Embodiment

FIG. 1 is an overall block diagram of a vehicle 100 according to an embodiment of the present invention. As will be described below in detail, vehicle 100 is a hybrid vehicle including a rotating electric machine and an engine as driving sources.

Referring to FIG. 1, vehicle 100 includes a power storage device 110, a system main relay (SRM) 115, a PCU (Power Control Unit) 120 which is a driving device, motor generators 130, 135, a power transmission gear 140, a drive wheel 150, an engine 160 which is an internal combustion engine, and an ECU (Electronic Control Unit) 300 which is a control device. PCU 120 includes a converter 121, inverters 122, 123, voltage sensors 180, 185, and capacitors C1, C2.

Power storage device 110 is an electric power storage component configured in a chargeable/dischargeable manner. Power storage device 110 includes a secondary battery such as a lithium-ion battery, a nickel-metal hydride battery or a lead-acid battery, or a power storage element such as an electric double layer capacitor.

Power storage device 110 is connected to PCU 120 through power lines PL1 and NL1. Power storage device 110 supplies PCU 120 with electric power for generating driving power for vehicle 100. Power storage device 110 stores electric power generated by motor generator 130. An output of power storage device 100 is, for example, about 200 V.

Power storage device 110 is provided with a voltage sensor 170 and a current sensor 175. Voltage sensor 170 detects a voltage VB of power storage device 110, and outputs the result of the detection to ECU 300. Current sensor 175 detects a current IB input to and output from the power storage device, and outputs the detected values to ECU 300.

SMR 115 includes a relay having one end connected to a positive electrode terminal of power storage device 110 and the other end connected to power line PL1 that is connected to PCU 120, and another relay having one end connected to a negative electrode terminal of power storage device 110 and the other end connected to power line NL1 that is connected to PCU 120. In response to a control signal SE1 from ECU 300, SMR 115 switches between supply and interruption of electric power between power storage device 110 and PCU 120.

In response to a control signal PWC from ECU 300, converter 121 converts a voltage between power lines PL1, NL1 and power lines PL2, NL1.

Inverters 122, 123 are connected in parallel to converter 121 through power lines PL2, NL1.

Inverter 122 is controlled by a control signal PWI1 from ECU 300, and converts DC power from converter 121 to AC power, to drive motor generator 130 (hereinafter also referred to as an "MG1"). Inverter 122 also converts AC power generated by motor generator 130 to DC power, and charges power storage device 110 through converter 121.

Inverter 123 is controlled by a control signal PWI2 from ECU 300, and converts DC power from converter 121 to AC power, to drive motor generator 135 (hereinafter also referred to as an "MG2"). Inverter 123 also converts AC power generated by motor generator 135 to DC power, and charges power storage device 110 through converter 121.

Motor generators 130, 135 are AC rotating electric machines, for example, permanent magnet synchronous motors including a rotor into which a permanent magnet is embedded.

Motor generators 130, 135 have output shafts coupled to power, transmission gear 140 including a power split device such as a planetary gear. Driving power from motor generators 130, 135 is transmitted to drive wheel 150.

Motor generators 130, 135 are also coupled to engine 160 through power transmission gear 140. Engine 160 is controlled by a control signal DRV from ECU 300. Driving power generated by engine 160 is transmitted to drive wheel 150 and motor generator 130 through power transmission gear 140. ECU 300 cooperatively controls driving power generated by motor generators 130, 135 and engine 160, to run the vehicle.

During regenerative braking operation of vehicle 100, motor generators 130, 135 can generate electric power by being rotated by drive wheel 150. The generated electric power is then converted to charging power for power storage device 110.

In this embodiment, motor generator 130 is used exclusively as a starter motor when starting engine 160 and as a generator for generating electric power by being driven by engine 160. Motor generator 135 is used exclusively as a motor for driving drive wheel 150 by using the electric power from power storage device 110.

Although FIG. 1 shows an exemplary configuration where two motor generators and one engine are provided, the number of motor generators is not limited as such. For example, one motor generator may be provided. Alternatively, more than two motor generators may be provided.

Capacitor C1 is provided between power lines PL1 and NL1, and reduces voltage variation between power lines PL1 and NL1. Capacitor C2 is provided between power lines PL2 and NL1, and reduces voltage variation between power lines PL2 and NL1.

Voltage sensors 180 and 185 detect voltages VL and VH across capacitors C1 and C2, respectively, and output the detected values to ECU 300.

A speed sensor 190 is provided in the vicinity of drive wheel 150 so as to detect the speed of vehicle 100 (vehicle speed). Speed sensor 190 detects a vehicle speed SPD based on a rotational speed of drive wheel 150, and outputs the detected value to ECU 300. As a speed sensor, a rotation angle sensor (not shown) for detecting a rotation angle of motor generator 135 may be used. In this case, ECU 300 causes vehicle speed SPD to be indirectly computed based on temporal variation in rotation angle of motor generator 135, a reduction ratio and the like.

Although not shown in FIG. 1, ECU 300 includes a CPU (Central Processing Unit), a storage device and an input/output buffer, causes input of signals from various sensors and the like and output of control signals to various devices, and controls the various devices of power storage device 110 and vehicle 100. Such control is not limited to software processing, but may be processed by dedicated hardware (electronic circuitry).

ECU 300 causes generation and output of control signals for controlling PCU 120, SMR 115 and the like. Although FIG. 1 shows a configuration where one control device is provided as ECU 300, a control device may be provided for each function or for each device to be controlled, such as a control device for PCU 120 and a control device for power storage device 110.

ECU 300 computes an SOC (State of Charge) of power storage device 110 based on the detected values of voltage VB and current IB from voltage sensor 170 and current sensor 175 provided on power storage device 110.

ECU 300 receives a request torque TR, which is determined based on operation of an accelerator pedal (not shown) by a user, from an upper ECU (not shown). ECU 300 causes generation of controls signals PWC, PWI1, PWI2 for converter 121 and inverters 122, 123 based on request torque TR from the user, respectively, to drive motor generators 130, 135.

ECU 300 also receives a mode signal MOD which is set by the user. This mode signal MOD is a signal for indicating whether or not inertial running control which will be described later should be performed. Mode signal MOD is switched by the user through a specific switch or setting on an operation screen. Alternatively, mode signal MOD may be automatically set when specific conditions are satisfied.

For example, ECU 300 operates such that the inertial running control is performed when mode signal MOD is set to ON, and operates such that normal running is performed without the inertial running control when mode signal MOD is set to OFF.

In such a hybrid vehicle, there is a need to improve gasoline mileage of the engine and electric mileage of the motor generators so as to improve energy efficiency as a whole during the vehicle running.

Inertial force acts on a vehicle during vehicle running. Thus, if driving power generated by a motor generator and an engine during running is made lower than driving power required to maintain the vehicle speed, running with the inertial force of the vehicle (hereinafter also referred to as "inertial running") is continued for some time while the vehicle speed gradually decreases.

During this inertial running, total driving power output from the motor generator and the engine is smaller than constant driving power output for maintaining the vehicle speed, thus reducing power consumption by the power storage device and fuel consumption by the engine. Accordingly, if the vehicle can run utilizing the inertial running, energy efficiency during the vehicle running can be improved.

Thus, according to the first embodiment, in the hybrid vehicle including the motor generator and the engine as driving sources, when the request torque from the user is substantially constant and the vehicle is running at a vehicle speed thereby maintained substantially constant, the inertial running control is performed to run the vehicle in which continuous driving power operation is performed on the engine to continuously output constant driving power, while driving power variation operation is performed on the motor generator to switch the motor generator between a high output state and a low output state in terms of driving power. Energy efficiency during the vehicle running may thus be improved.

Figure 2:
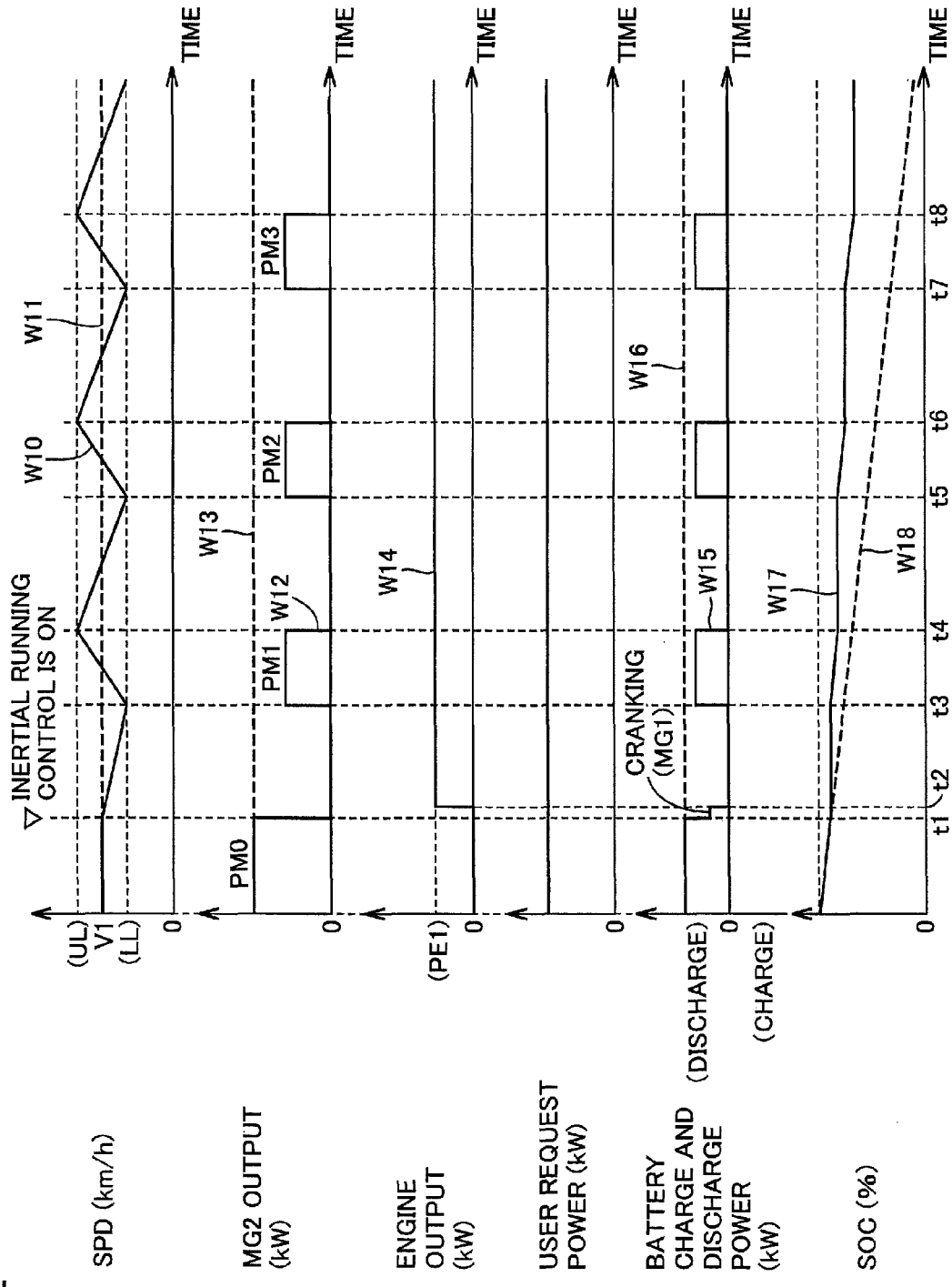
FIG. 2 is a first time chart illustrating the outline of a first example of inertial running control in a first embodiment.
Figure 3:
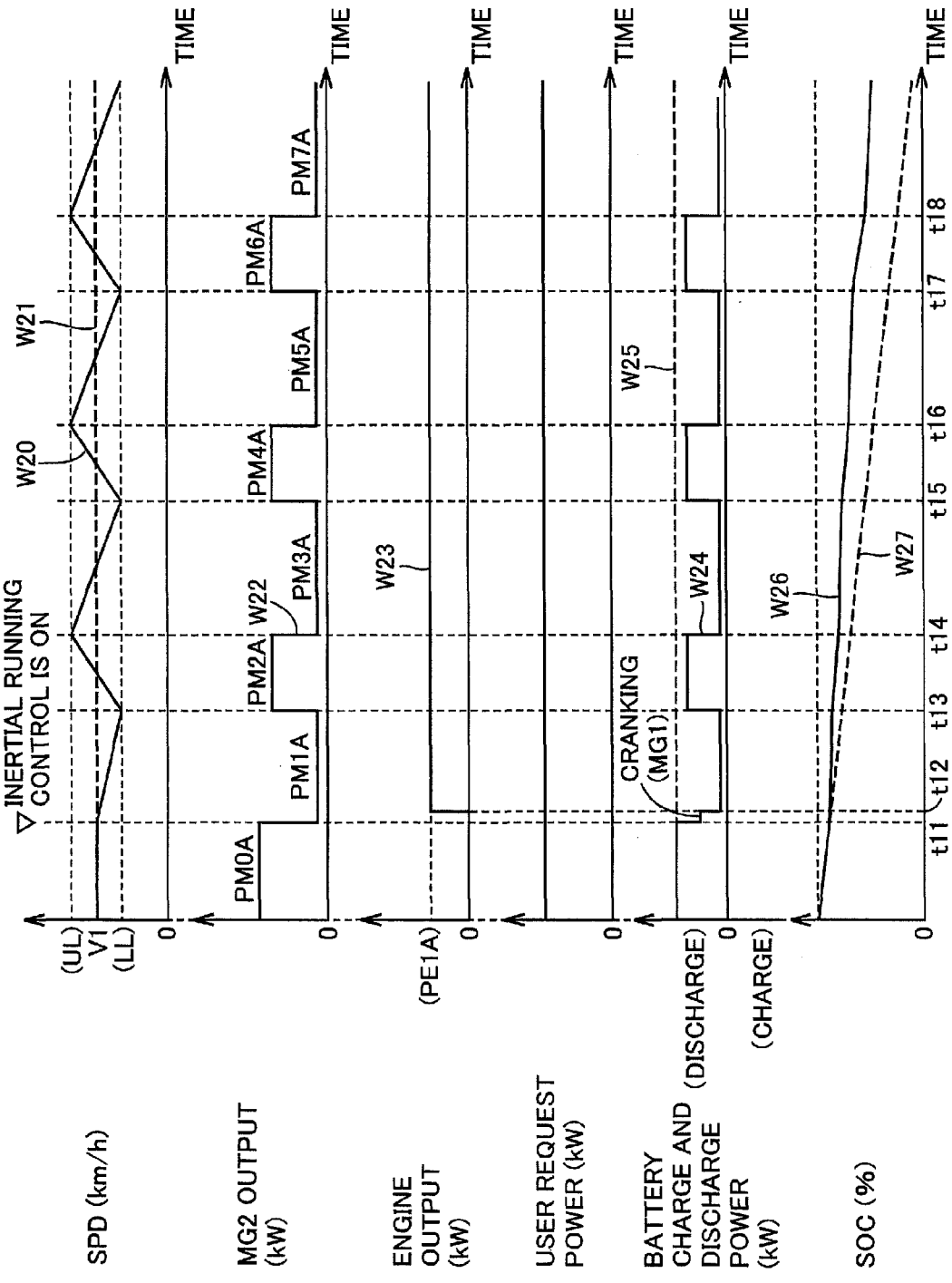
FIG. 3 is a first time chart illustrating the outline of a second example of inertial running control in the first embodiment.
Figure 4:
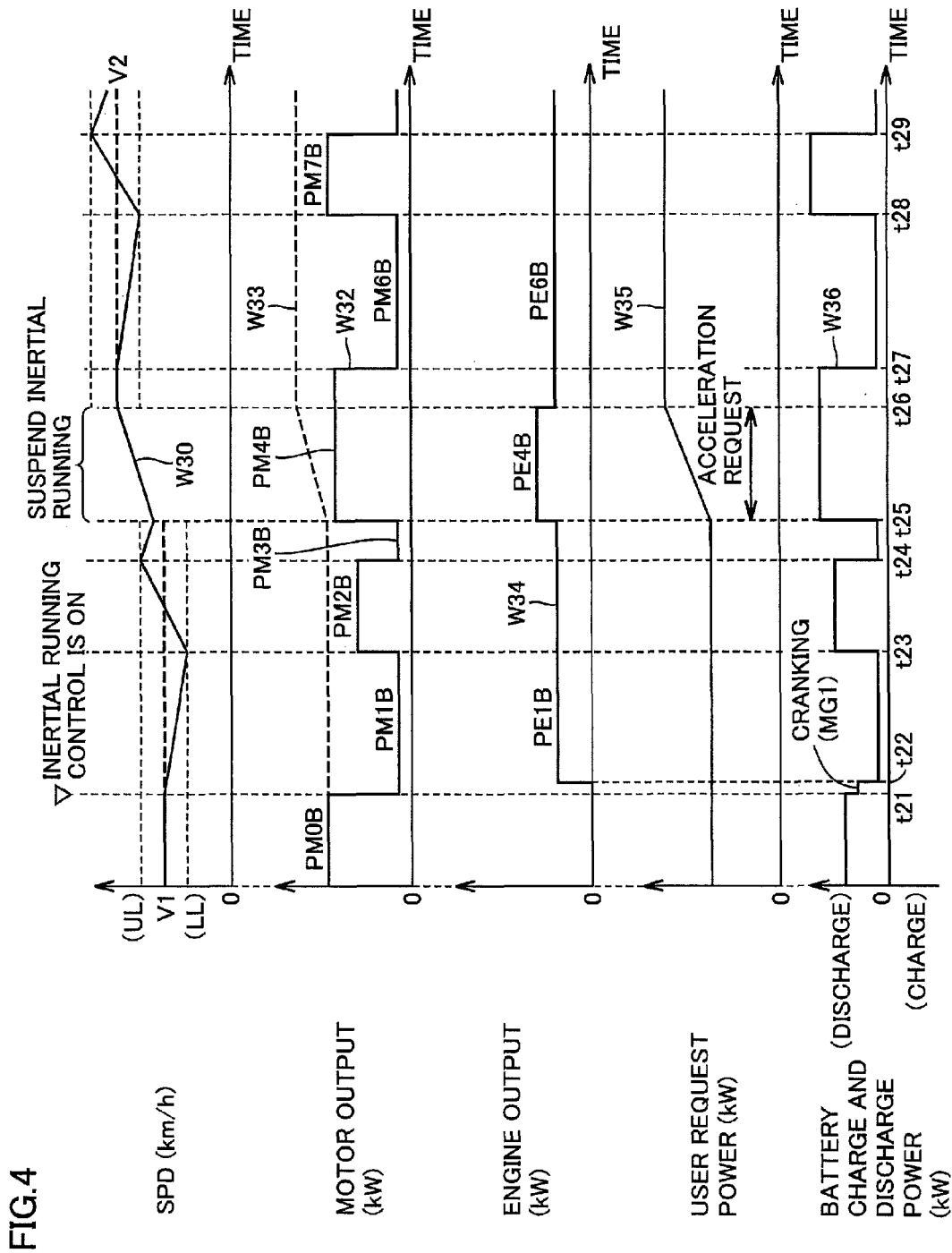
FIG. 4 is a time chart illustrating operation during acceleration in the inertial running control.

Referring now to FIGS. 2 to 4, the outline of the inertial running control in the first embodiment will be described. FIG. 2 is a time chart illustrating a basic running pattern of the inertial running control in the first embodiment. In FIG. 2 and FIG. 3 which will be described later, a horizontal axis represents time, and a vertical axis represents vehicle speed SPD, the output of the motor generator, the output of the engine, request power from the user, charge and discharge power of the power storage device, and the SOC of the power storage device. Regarding the charge and discharge power of the power storage device, the discharge power is represented as positive value and the charge power is represented as negative value.

Referring to FIGS. 1 and 2, it is assumed, for example, that vehicle 100 is running on a flat road at a constant vehicle speed V1. In this case, power requested by the user is given as a substantially constant value, as shown in FIG. 2. That "power requested by the user is a substantially constant value" refers to a state in which the user request power is maintained within a predetermined range (e.g., ±3 km/h) during a prescribed period of time, albeit with some variation.

In a comparative example to which the inertial running control in the first embodiment is not applied, EV running is performed using a continuous output of substantially constant magnitude (PM0) from motor generator 135, for example, as indicated by a broken line W13 in FIG. 2. As such, vehicle speed SPD is maintained substantially constant, as indicated by a broken line W11 in FIG. 2.

At this time, power storage device 110 continuously outputs constant electric power as indicated by a broken line W16 in FIG. 2, causing the SOC of power storage device 110 to linearly decrease as indicated by a broken line W18 in FIG. 2.

In contrast, when the inertial running control in the first embodiment is applied, engine 160 is operated to output constant driving power, while the driving power variation operation is performed in which acceleration running of driving motor generator 135 and inertial running of stopping motor generator 135 are alternately repeated.

Specifically, until time t1, the inertial running control in the first embodiment is not applied, and EV running is performed with continuous motor output PM0, for example.

When the user indicates that the inertial running control should be performed at time t1, first, motor generator 135 is stopped (a solid line W12 in FIG. 2).

Furthermore, in response to the indication that the inertial running control should be performed, engine 160 is cranked and started by motor generator 130 (MG1) between times t1 and t2. After self-sustained operation of engine 160 is established, engine 160 is operated to output a constant output PE1. This constant output PE1 is set, for example, as an output which is smaller than driving power capable of maintaining current vehicle speed V1 and which also allows for high-efficiency operation (namely, high gasoline mileage) of engine 160.

As a result, between times t1 and t3 during which motor generator 135 is stopped, running with the inertial force is started and vehicle speed SPD gradually decreases, as indicated by a solid line W10 in FIG. 2.

At this time, the charge and discharge power of power storage device 110 becomes zero (a solid line W15 in FIG. 2). Thus, reduction in SOC can be suppressed (a solid line W17 in FIG. 2) as compared to the example where the first embodiment is not applied.

Then, when vehicle speed SPD decreases to a lower limit value LL of a predetermined acceptable range with respect to target vehicle speed V1 (time t3 in FIG. 2), motor generator 135 is driven. An output of motor generator 135 is set such that the sum of motor output and engine output at this time (PM1+PE1) is larger than output PM0 required to maintain vehicle speed V1. Vehicle 100 is thus accelerated.

Then, when vehicle speed SPD increases to an upper limit value UL of the predetermined acceptable range, motor generator 135 is stopped again (time t4 in FIG. 2) and inertial running is performed.

Then, in a similar manner, motor generator 135 is driven when vehicle speed SPD decreases to lower limit value LL, and motor generator 135 is stopped when vehicle speed SPD increases to upper limit value UL.

By repeating the driving power variation operation on the motor generator in this manner, an average speed of vehicle speed SPD can be maintained substantially at V1, albeit with variation within the above acceptable range. Since reduction in SOC of the power storage device can be suppressed during a period when the motor generator is stopped, electric mileage can be improved. Furthermore, at this time, by adjusting the engine output such that the engine is operated in a high-efficiency operation range, gasoline mileage of the engine can also be improved. As a result, energy efficiency during running can be improved as a whole.

It is to be noted that the total output (motor output+engine output) required to perform the acceleration running and acceleration time can be set in an arbitrary manner. For example, the acceleration time may be set to a prescribed period of time, and the total output may be set such that vehicle speed SPD can be increased from lower limit value LL to upper limit value UL during that period. Alternatively, the total output used for acceleration may be fixed to a prescribed output, and the acceleration time may be set depending on the situation. If the acceleration time is too short, however, large power is needed, which may cause torque shock. If the total output is too small, on the other hand, the acceleration time, namely, driving time of motor generator 135 and engine 160 is increased, making it difficult to perform inertial running. Therefore, the acceleration time and the total output during acceleration are set appropriately in consideration of drivability and energy efficiency.

The operation in which driving and stopping of motor generator 135 is repeated has been described in the above example. If the user request power is relatively large, for example, large deceleration occurs during the period of inertial running with the driving power of only engine 160, which may cause large torque shock between acceleration running and inertial running. In that case, therefore, instead of stopping motor generator 135 during inertial running, motor generator 135 may be operated to output driving power smaller than the driving power during the period of acceleration running, as shown in FIG. 3. By switching the driving power from the motor generator between a high output state and a low output state in this manner, the torque shock between acceleration running and inertial running can be alleviated to improve drivability.

In order for the driving power of engine 160 operated to output constant driving power to be within the high-efficiency operation range as described above, motor generator 135 may be operated in a low output state during the period of inertial running.

It is to be noted that the total outputs in a high output state in the respective periods of acceleration running do not necessarily need to be constant, and may be the same as or different from one another in magnitude. The total outputs in a low output state may likewise be the same as or different from one another in magnitude.

In the inertial running control according to the first embodiment, as described above, the driving power variation operation of the motor generator as shown in FIGS. 2 and 3 is performed when the user request power is substantially constant. In other words, the driving power variation operation of the motor generator is not performed during acceleration and deceleration when the user request power varies.

Figure 5:
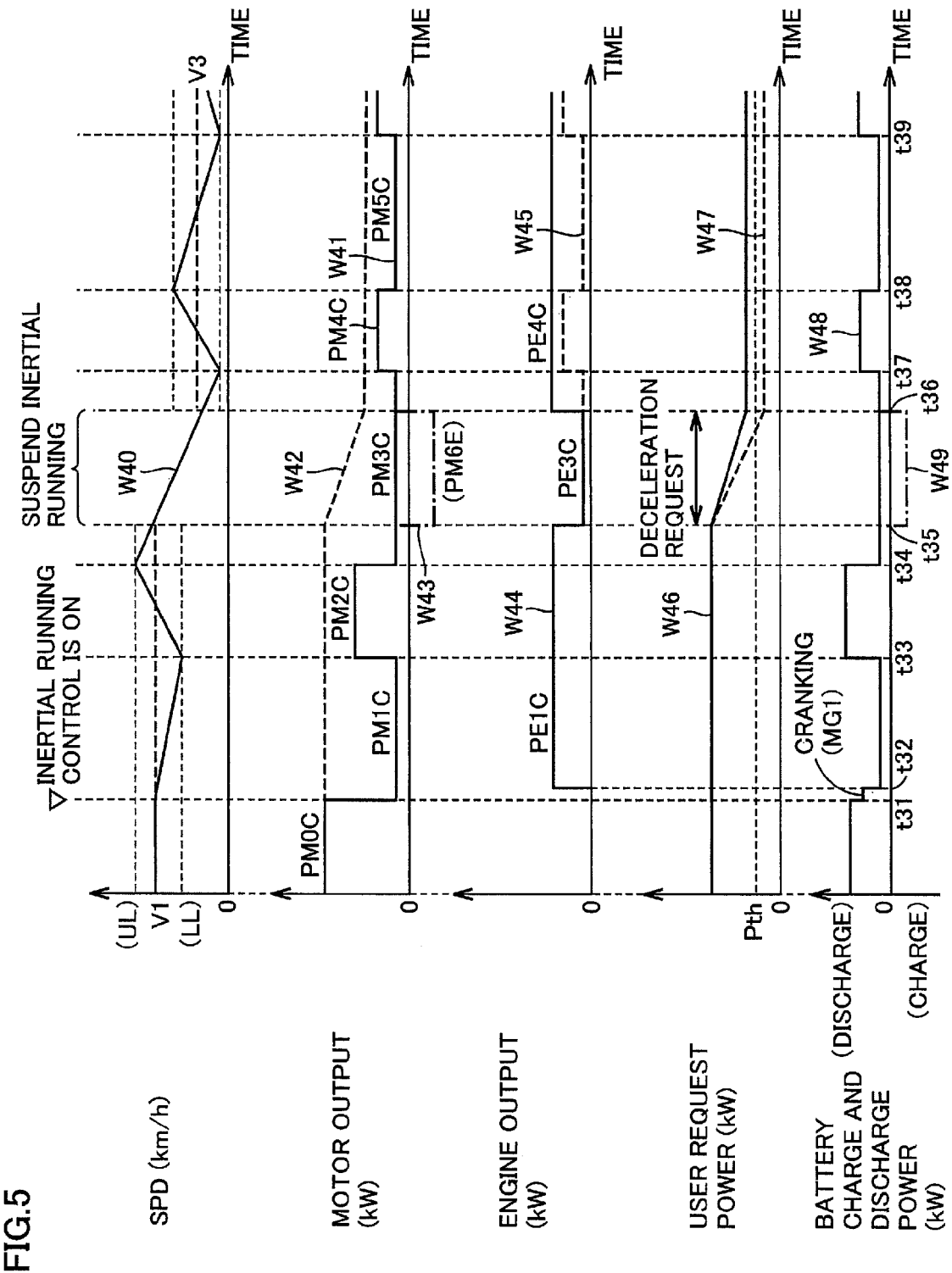
FIG. 5 is a time chart illustrating operation during deceleration in the inertial running control.

FIGS. 4 and 5 illustrate operations during acceleration and deceleration, respectively, when the inertial running control is applied. In FIGS. 4 and 5, a horizontal axis represents time, and a vertical axis represents vehicle speed SPD, the output of the motor generator, the output of the engine, request power from the user, and charge and discharge power of the power storage device.

Referring to FIGS. 1 and 4, when the user indicates that the inertial running control should be performed at time t21, as was described with reference to FIG. 2, the continuous driving power operation of engine 160 and the driving power variation operation of motor generator 135 are performed so as to maintain vehicle speed V1 until time t24.

Then, when an acceleration request is received with an increase in user request power at time t25 during inertial running (a solid line W35 in FIG. 4), the driving power variation operation of motor generator 135 is suspended while the user request power varies (between times t25 and t26). Then, the motor output and engine output are increased for acceleration (solid lines W32, W34 in FIG. 4).

Then, when the acceleration operation by the user ends and vehicle speed SPD becomes constant at V2 (V2>V1) at time t26, motor generator 135 is switched to a low output state again and engine 160 is switched to a constant output state, and the driving power variation operation of motor generator 135 is resumed so as to maintain vehicle speed V2 (a solid line W30 in FIG. 4).

An output PE6B of engine 160 after the vehicle speed variation may be the same as or different from an output PE1B before the vehicle speed variation.

Next, the operation during deceleration is described with reference to FIG. 5. Referring to FIGS. 1 and 5, the driving power variation operation of motor generator 135 is performed so as to maintain vehicle speed V1 until time t34, as with the period until time t24 in FIG. 4.

Then, when a deceleration request is received with a decrease in user request power at time t35 during inertial running (a solid line W46 in FIG. 5), the driving power variation operation is suspended while the user request power varies (between times t35 and t36). At this time, the motor output and engine output are put in a low output state, and the vehicle is decelerated while being maintained in an inertial running state (solid lines W41, W44 in FIG. 5). Although not shown in FIG. 5, when a deceleration request is received during acceleration running, acceleration operation is suspended and the running is shifted to inertial running.

Alternatively, if the vehicle needs to be decelerated more quickly, regenerative braking may be performed by motor generator 135 during a period when a deceleration request is received. In this case, motor generator 135 outputs a negative motor output PM6B by regeneration (a chain-dotted line W43 in FIG. 5). Power storage device 110 is then charged with the generated electric power (a chain-dotted line W49 in FIG. 5), thus increasing the SOC.

Then, when the deceleration request by the user is cancelled and vehicle speed SPD becomes constant at V3 (V1>V3) at time t36, engine 160 is operated to output constant driving power again. Then, when vehicle speed SPD decreases to lower limit value LL (time t37 in FIG. 5), motor generator 135 is switched to a high output state, to resume the driving power variation operation.

In this manner, if the vehicle is accelerated or decelerated in response to the variation in user request power while the inertial running control is applied, the constant driving power operation of engine 160 and the driving power variation operation of motor generator 135 are suspended.

While the vehicle is decelerated, if the user request power is sufficiently reduced by a deceleration request from the operation by the user, as indicated by a broken line W47 in FIG. 5, inertial running may not be performed if engine 160 outputs constant driving power. When the inertial running control is performed with the user request power falling below a predetermined threshold value Pth in this manner, engine 160 may be subjected to the driving power variation operation of switching engine 160 between a high output state during the period of acceleration running and a low output state during the period of inertial running, in a manner similar to motor generator 135. Alternatively, acceleration running and inertial running may be repeated by performing the driving power variation operation on motor generator 135 while keeping engine 160 in an idle state.

Although the output of motor generator 135 is not zero during the period of inertial running in the time charts described with reference to FIGS. 4 and 5, if the effect of torque shock and the like on drivability is small, the driving power of motor generator 135 in a low output state may be set to zero to stop motor generator 135, as shown in FIG. 2.

Figure 6:
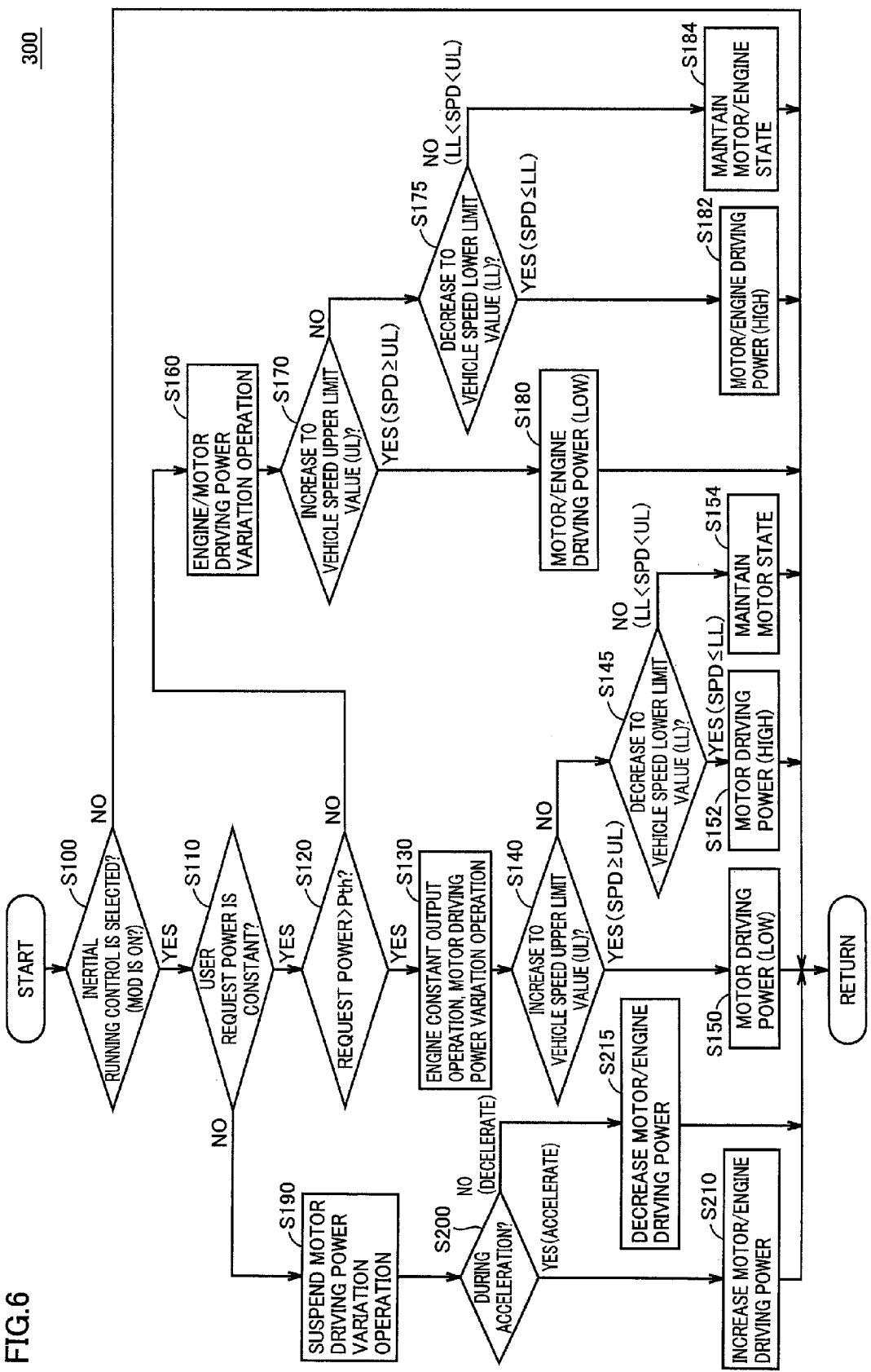
FIG. 6 is a flow chart illustrating a process of inertial running control performed by an ECU in the first embodiment.

FIG. 6 is a flow chart illustrating the process of the inertial running control performed by ECU 300 in the first embodiment. The steps in the flow chart shown in FIG. 6 are implemented by executing a program stored in advance in ECU 300 at regular intervals. Alternatively, processing of part of the steps may be implemented by building dedicated hardware (electronic circuitry).

Referring to FIGS. 1 and 6, in step (the step is hereinafter abbreviated as S) 100, ECU 300 causes a determination to be made of whether or not the inertial running control has been selected based on mode signal MOD which is set by the user.

If mode signal MOD has been set to OFF and the inertial running control has not been selected (NO in S100), the subsequent processing is skipped and ECU 300 causes the process to return to a main routine.

If mode signal MOD has been set to ON and the inertial running control has been selected (YES in S100), the process proceeds to S110, and ECU 300 then causes a determination to be made of whether or not the user request power is substantially constant based on request torque TR.

If the user request power is substantially constant (YES in S110), the process proceeds to S120, and ECU 300 causes a determination to be made of whether or not the user request power is larger than predetermined threshold value Pth.

If the user request power is larger than threshold value Pth (YES in S120), the process proceeds to S130, and ECU 300 causes engine 160 to be started and the constant driving power operation to be performed on the engine to output prescribed driving power, and causes the driving power variation operation to be performed on motor generator 135. Although not shown in FIG. 6, immediately after the start of the driving power variation operation, motor generator 135 is put in a low output state and inertial running is performed, as shown in FIGS. 2 to 5. The low output state includes a state in which the driving power is zero as shown in FIG. 2.

Then, in S140, ECU 300 causes a determination to be made of whether or not vehicle speed SPD has increased to upper limit value UL of the acceptable speed range.

As described above, immediately after the start of the driving power variation operation, motor generator 135 is initially put in a low output state and inertial running is performed. Thus, vehicle speed SPD is lower than upper limit value UL, and gradually decreases.

That is, since vehicle speed SPD has not increased to upper limit value UL of the acceptable speed range (NO in S140), the process proceeds to S145, and ECU 300 then causes a determination to be made of whether or not vehicle speed SPD has decreased to lower limit value LL of the acceptable speed range.

While vehicle speed SPD decreases within the acceptable speed range (LL<SPD<UL), namely, when vehicle speed SPD has not decreased to lower limit value LL of the acceptable speed range (NO in S145), the process proceeds to S154, and ECU 300 causes a current state of motor generator 135 to be maintained, to continue the inertial running in a low output state. The process then returns to the main routine, and the process is performed again from S100 in the next control cycle.

Then, when vehicle speed SPD decreases to lower limit value LL of the acceptable speed range (SPD≤LL) while the inertial running is continued (YES in S145), the process proceeds to S152, and ECU 300 causes motor generator 135 to be switched to a high output state to perform acceleration running. Vehicle speed SPD thus increases.

While the vehicle speed increases within the acceptable speed range due to the acceleration running being performed, NO is selected in S140 and S145, Then, in S154, ECU 300 causes motor generator 135 to be maintained in a high output state, to continue the acceleration running until vehicle speed SPD reaches upper limit value UL of the acceptable speed range.

Then, when vehicle speed SPD increases to upper limit value UL of the acceptable speed range (YES in S140), the process proceeds to S140, and ECU 300 causes motor generator 135 to be switched to a low output state to perform inertial running.

While the user request power is maintained substantially constant, the driving power variation operation as described above is performed so as to maintain vehicle speed SPD within the acceptable speed range.

If the user request power varies for the purpose of acceleration or deceleration (NO in S110), on the other hand, the process proceeds to S190, and ECU 300 causes the driving power variation operation of motor generator 135 to be suspended.

Then, when acceleration is indicated by the user request power (YES in S200), ECU 300 causes the driving power of engine 160 and/or motor generator 135 to be increased, to accelerate vehicle 100 (S210).

When deceleration is indicated by the user (NO in S200), the process proceeds to S215, and ECU 300 causes either deceleration by inertial running in which motor generator 135 and engine 160 are put in a low output state, or deceleration involving regenerative braking in which motor generator 135 is driven in a regenerative state while engine 160 is put in a low output state, to be performed. Alternatively, the vehicle may be decelerated by switching between the deceleration by inertial running and the deceleration involving regenerative braking.

Then, when the acceleration or deceleration operation by the user ends and the user request power becomes substantially constant (YES in S110), the driving power variation operation is resumed.

Then, when the user request power becomes equal to or lower than threshold value Pth due to a deceleration request by the user (NO in 120), the process proceeds to S160. Then, ECU 300 causes the driving power variation operation to be performed on both engine 160 and motor generator 135.

Then, in a manner similar to the above processing between S140 and S154, when vehicle speed SPD increases to upper limit value UL (YES in S170), ECU 300 causes both motor generator 135 and engine 160 to be switched to a low output state to perform inertial running (S180).

While the vehicle is decelerated by inertial running (NO in S170 and NO in S175), the process proceeds to S184, and ECU 300 causes both motor generator 135 and engine 160 to be maintained in a low output state.

When vehicle speed SPD decreases to lower limit value LL (YES in S175), ECU 300 causes motor generator 135 and engine 160 to be switched to a high output state to perform acceleration running (S182). Then, until vehicle speed SPD reaches upper limit value UL, ECU 300 causes motor generator 135 and engine 160 to be maintained in a high output state to continue the acceleration running (S184).

Then, when vehicle speed SPD increases to upper limit value UL (YES in S170), motor generator 135 and engine 160 are switched to a low output state again (S180).

By performing the control in accordance with the process as described above, when the user request power is substantially constant in the hybrid vehicle including the engine and the motor generator, the continuous driving power operation is performed on the engine to output constant driving power while the driving power variation operation is performed on the motor generator, thereby attaining running involving inertial running. As a result, energy efficiency during the vehicle running can be improved.

Second Embodiment

In the first embodiment, the configuration in which the engine is operated to output constant driving power while the motor generator is subjected to the driving power variation operation in the inertial running control was described.

In a second embodiment, in a manner opposite to the first embodiment, a configuration in which the continuous driving power operation is performed on the motor generator to output constant driving power while the driving power variation operation is performed on the engine will be described. Such an operation state is implemented, for example, when the power storage device has a relatively high SOC.

Figure 7:
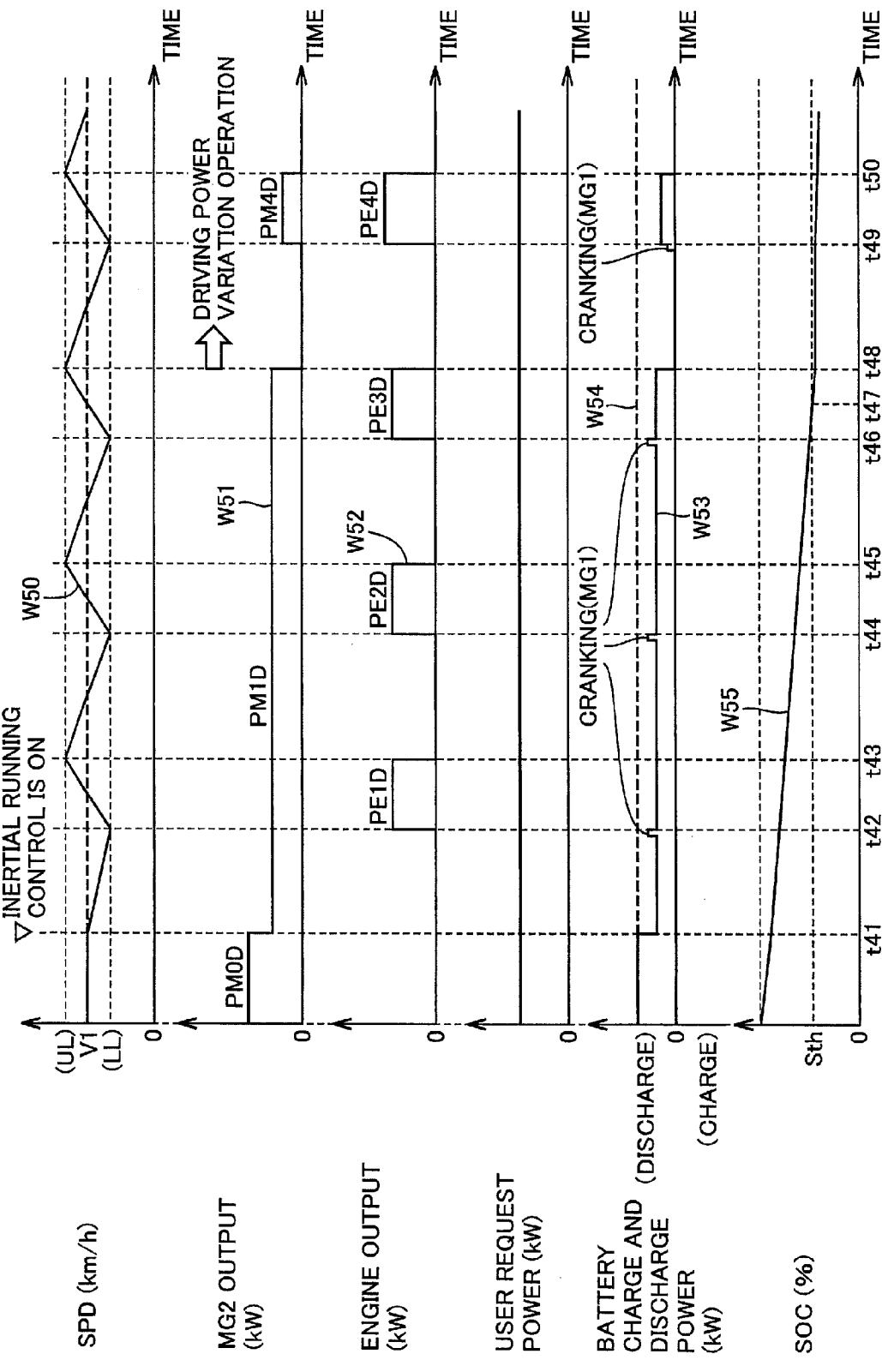
FIG. 7 is a first time chart illustrating the outline of a first example of inertial running control in a second embodiment.
Figure 8:
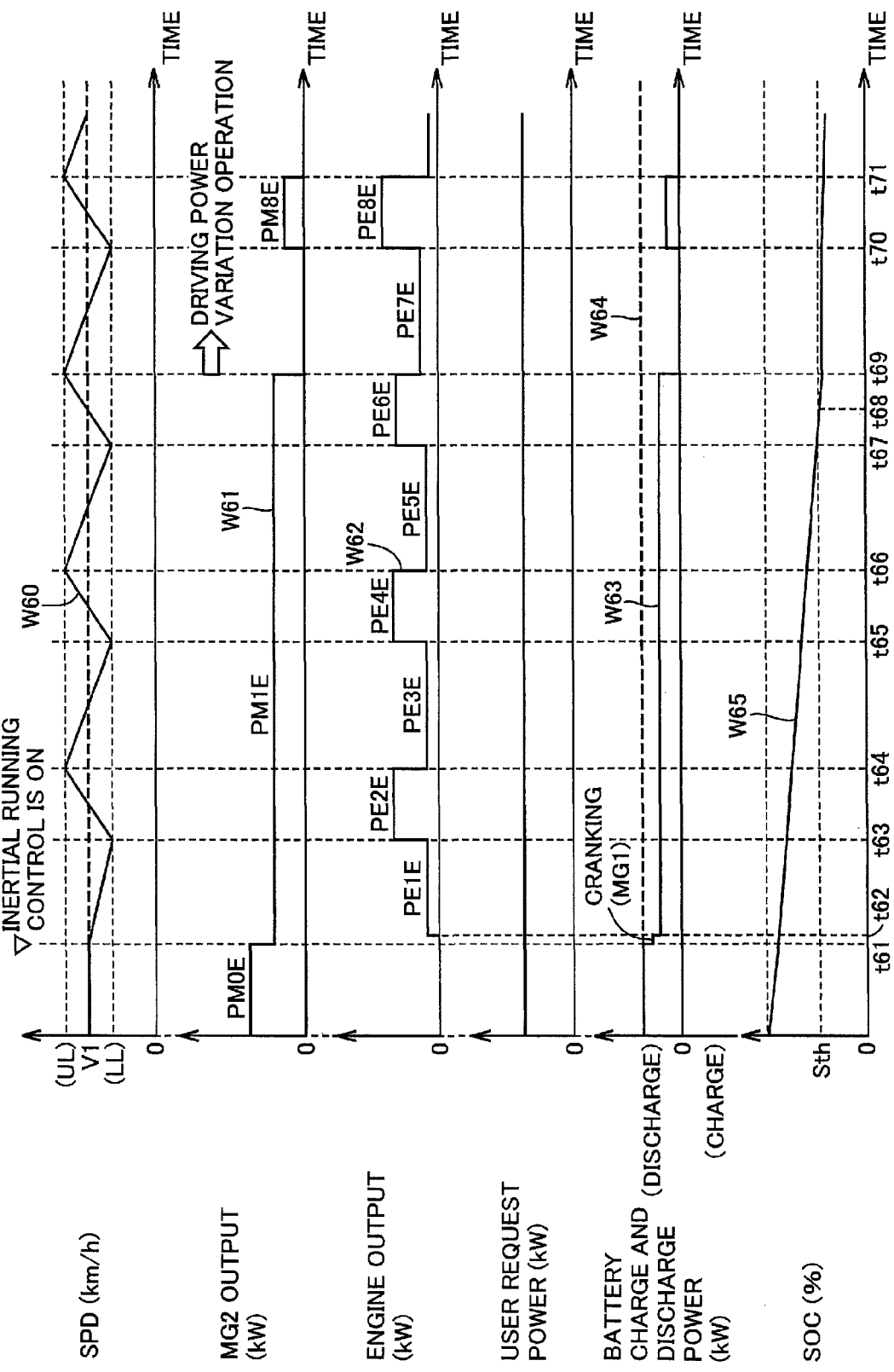
FIG. 8 is a first time chart illustrating the outline of a second example of inertial running control in the second embodiment.

FIGS. 7 and 8 are time charts illustrating the outline of the inertial running control in the second embodiment. In FIGS. 7 and 8, in a manner similar to FIG. 2 and FIG. 3, a horizontal axis represents time, and a vertical axis represents vehicle speed SPD, the output of the motor generator, the output of the engine, request power from the user, charge and discharge power of the power storage device, and the SOC of the power storage device.

Referring to FIGS. 1 and 7, in a manner similar to FIG. 2, it is assumed that vehicle 100 is EV running at constant vehicle speed V1, with a constant output PM0D from motor generator 135.

When the inertial running control is selected by the user at time t41, the output of motor generator 135 is reduced to a constant output PM1D. At this time, engine 160 is in a stopped state. In this state, output PM1D of motor generator 135 is smaller than output PM0D capable of maintaining vehicle speed V1, so that vehicle 100 runs with inertial force and vehicle speed SPD gradually decreases.

Then, immediately before vehicle speed SPD decreases to lower limit value LL of the acceptable range, engine 160 is cranked and started by motor generator 130. Then, when vehicle speed SPD decreases to lower limit value LL of the acceptable range at time t42, engine 160 is switched to a high output state, to perform acceleration running with output PM1D from motor generator 135 and an output PE1D from engine 160.

When vehicle speed SPD increases to upper limit value UL of the acceptable range (time t43 in FIG. 7), engine 160 is stopped to perform inertial running again. Then, engine 160 is restarted immediately before vehicle speed SPD decreases to lower limit value LL of the acceptable range. When vehicle speed SPD decreases to lower limit value LL of the acceptable range (time t4 in FIG. 7), engine 160 is switched to a high output state again to perform acceleration running.

In this manner, inertial running and acceleration running are performed repeatedly by the driving power variation operation of engine 160. In this second embodiment, motor generator 135 is operated to output constant driving power, causing the SOC to linearly decrease as indicated by a solid line W55 in FIG. 7.

Then, when the SOC falls below a reference value Sth serving as a control target value of the SOC during running (time t47 in FIG. 7), for example, motor generator 135 is stopped at the start of the next inertial running (time t48 in FIG. 7). As a result, power consumption during the period of inertial running is suppressed.

Then, when engine 160 is driven immediately before vehicle speed SPD decreases to lower limit value LL of the acceptable range and vehicle speed SPD decreases to lower limit value LL (time t49 in FIG. 7), the driving power of motor generator 135 and engine 160 is increased to perform acceleration operation.

In this manner, the hybrid vehicle runs utilizing the inertial running by performing the continuous driving power operation on the motor generator to output constant driving power while performing the driving power variation operation on the engine, thereby improving energy efficiency during the vehicle running. When the SOC falls below the predetermined reference value, the driving power variation operation of switching between driving and stopping is performed on the motor generator as well, thereby reducing the degree of reduction in SOC.

When the SOC decreases to a level that requires charging, motor generator 130 (MG1) is driven by increasing the driving power of engine 160 during the period of acceleration running, to charge power storage device 110 to a prescribed level with the electric power generated by MG1, and the same holds true for the first embodiment.

According to the method shown in FIG. 7, engine 160 needs to be started whenever the acceleration operation is performed. To start engine 160, however, motor generator 130 needs to be driven, and furthermore, fuel may be wasted until self-sustained operation of engine 160 is established. Moreover, when engine 160 and a catalyst (not shown) for purifying emissions have a low temperature, combustion efficiency of the engine may be lowered and a state of emissions may be deteriorated.

Accordingly, as shown in FIG. 8, engine 160 may be put in a low output state such as idle operation, rather than being stopped, during the period of inertial running. In this case, engine 160 consumes fuel in an operation state even during the period of inertial running. Nonetheless, if an energy loss due to the idle operation is smaller than an energy loss when starting the engine, total energy efficiency may be higher when engine 160 is in a low output state than when engine 160 is stopped. Thus, the magnitude of driving power in the low output state during the driving power variation operation of engine 160 is determined in consideration of overall energy efficiency.

Moreover, the driving power during the period of inertial running in the driving power variation operation of motor generator 135, when the SOC becomes equal to or lower than the reference value, is determined appropriately whether to set the output to zero as shown in FIGS. 7 and 8, or to output small driving output power, in consideration of the presence or absence of torque shock due to the variation in deceleration and the like.

Figure 9:
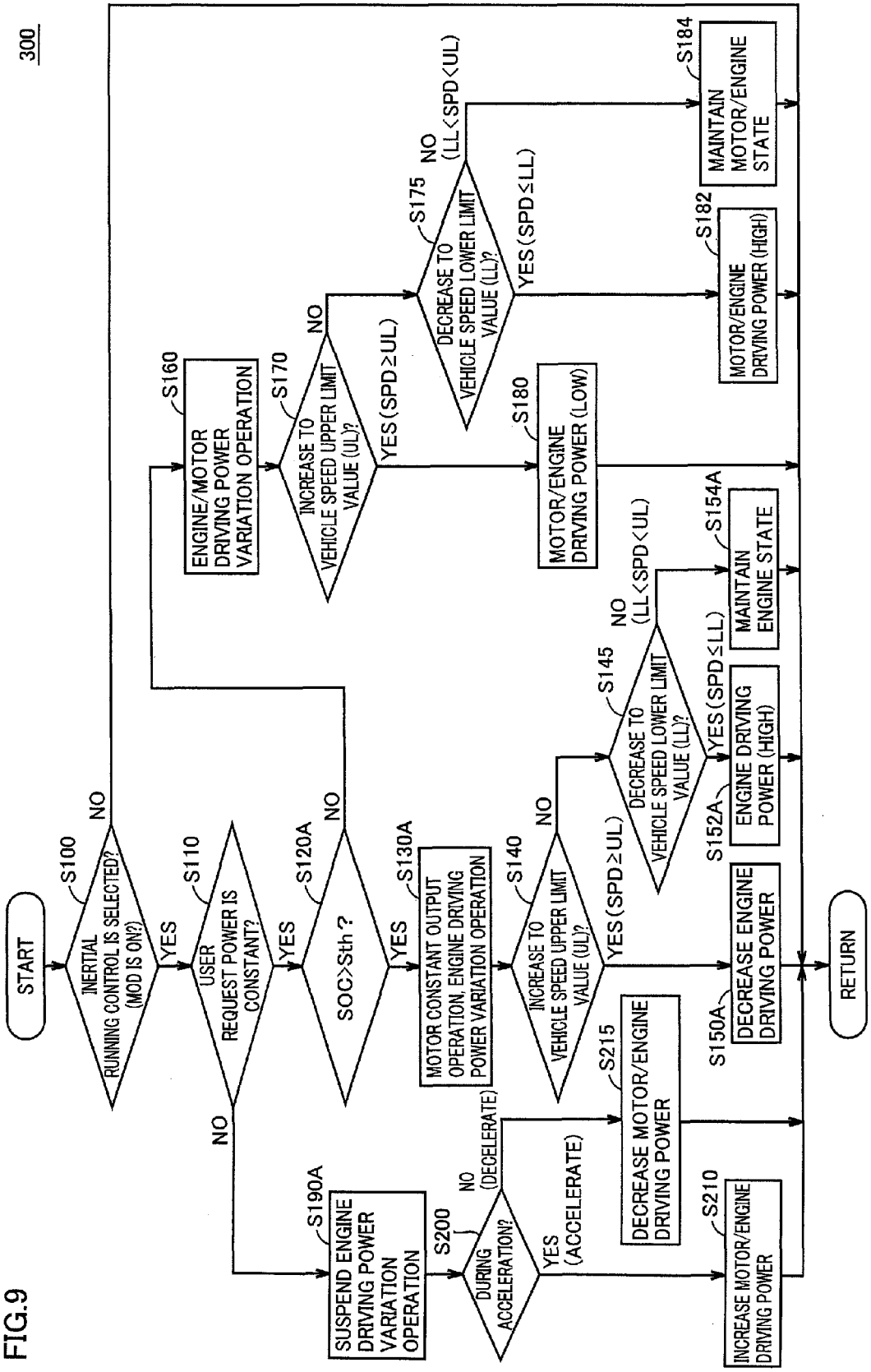
FIG. 9 is a flow chart illustrating a process of inertial running control performed by the ECU in the second embodiment.

FIG. 9 is a flow chart illustrating the process of the inertial running control performed by ECU 300 in the second embodiment. In FIG. 9, steps S120, S130, S150, S152, S154 and S190 in the flow chart of FIG. 6 in the first embodiment are replaced by S120A, S130A, S150A, S152A, S154A and S190A, respectively. The descriptions of the steps in FIG. 9 the same as those in FIG. 6 will not be repeated.

Referring to FIG. 9, when the inertial running control is selected by the user (YES in S100), and when the user request power is substantially constant (YES in S110), the process proceeds to S120A, and ECU 300 causes a determination to be made of whether or not the current SOC is larger than predetermined reference value Sth.

If the SOC is larger than predetermined reference value Sth (YES in S120A), the process proceeds to S130A, and ECU 300 causes the continuous driving power operation to be performed on motor generator 135 to output constant driving power smaller than the driving power capable of maintaining current vehicle speed SPD, and causes the driving power variation operation to be performed on engine 160.

When vehicle speed SPD increases to upper limit value UL during the acceleration running of vehicle 100 (YES in S140), ECU 300 causes engine 160 to be switched to a low output state to perform inertial running (S150A).

While vehicle 100 is decelerated in the inertial running (NO in S140 and NO in S145), the process proceeds to S154A, and ECU 300 causes engine 160 to be maintained in a low output state to continue the inertial running until vehicle speed SPD decreases to lower limit value LL.

When vehicle speed SPD decreases to lower limit value LL (YES in S145), ECU 300 causes engine 160 to be switched to a high output state to perform acceleration running (S152A). Then, until vehicle speed SPD reaches upper limit value UL, ECU 300 causes engine 160 to be maintained in a high output state to continue the acceleration running (S154A).

Then, when vehicle speed SPD increases to upper limit value UL (YES in S140), ECU 300 causes engine 160 to be switched to a low output state again to perform inertial running.

When the SOC becomes equal to or lower than predetermined reference value Sth in S120A (NO in S120A), on the other hand, the process proceeds to S160, and ECU 300 causes the driving power variation operation to be performed on both motor generator 135 and engine 160.

The subsequent processing is similar to the processing between steps S170 and S184 in the first embodiment, and the description thereof will not be repeated.

If the user request power varies for the purpose of acceleration or deceleration (NO in S110), the process proceeds to S190A, and ECU 300 causes the driving power variation operation of engine 160 to be suspended.

Then, when acceleration is indicated by the user request power (YES in S200), ECU 300 causes the driving power of engine 160 and/or motor generator 135 to be increased, to accelerate vehicle 100 (S210).

When deceleration is indicated by the user (NO in S200), the process proceeds to S215, and ECU 300 causes deceleration operation to be performed by deceleration utilizing inertial running or deceleration involving regenerative braking, or by switching between these decelerations.

In the second embodiment, too, the low output state during the driving power variation operation is intended to include a state in which the driving power is zero. Then, as was described with reference to FIGS. 7 and 8, the magnitude of driving power is set appropriately in consideration of the operation state of vehicle 100 and energy efficiency.

Although not shown in FIG. 9, if engine 160 is not stopped during the period of inertial running as shown in FIG. 8, engine 160 is started in step S130A in FIG. 9.

By performing the control in accordance with the process as described above, when the user request power is substantially constant in the hybrid vehicle including the engine and the motor generator, the continuous driving power operation is performed on the motor generator to output constant driving power while the driving power variation operation is performed on the engine, thereby attaining running involving inertial running. As a result, energy efficiency during the vehicle running can be improved.

Third Embodiment

In the first and second embodiments above, the hybrid vehicle including the engine and the motor generator as a plurality of driving sources was described by way of example. The present invention is also applicable to vehicles having other configurations, such as an electric vehicle having a twin motor configuration capable of running with driving power from two motor generators as a plurality of driving sources, as shown in FIG. 10, for example.

Figure 10:
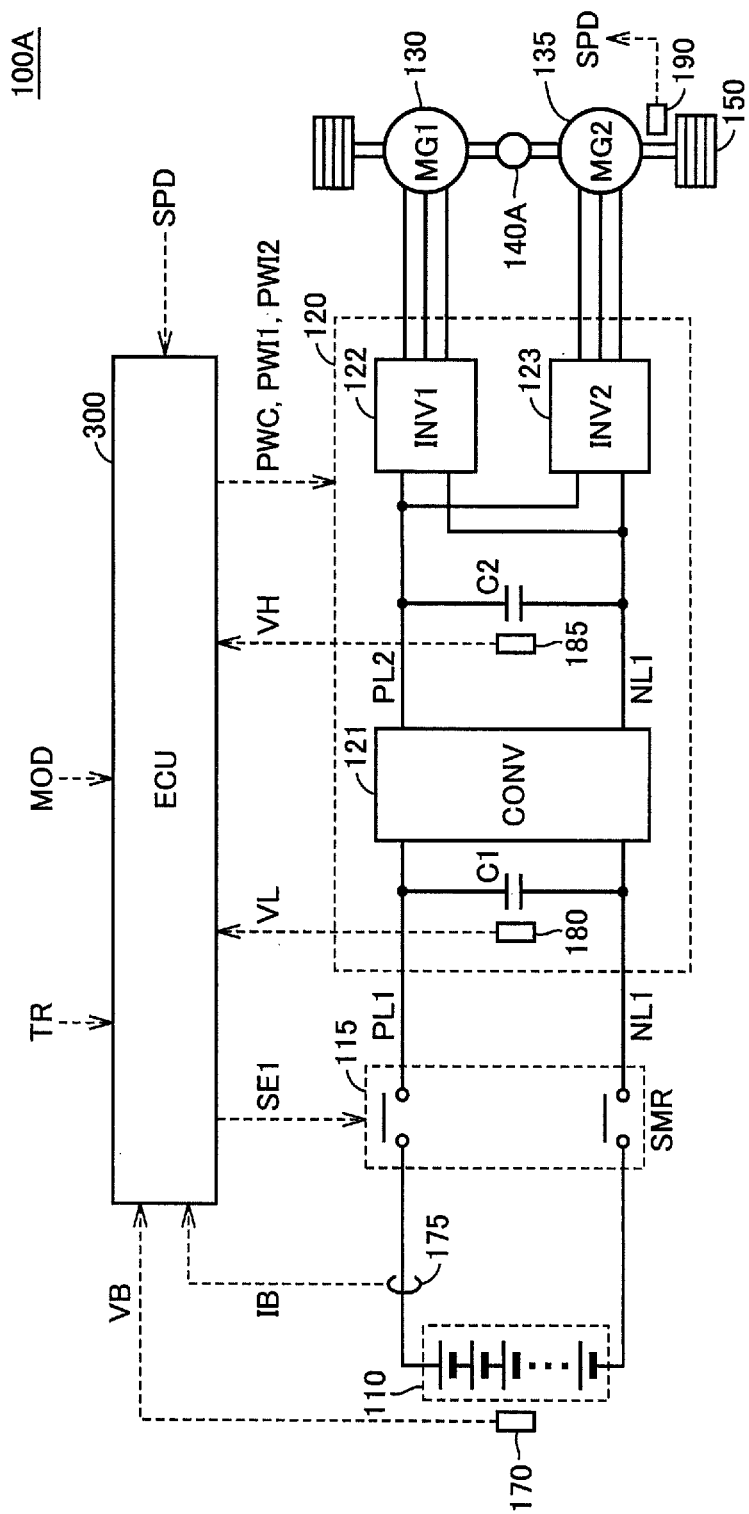
FIG. 10 is an overall block diagram of a vehicle in a third embodiment including two motor generators as driving sources.

A vehicle 100A in FIG. 10 has the configuration of vehicle 100 in FIG. 1 which is not provided with engine 160. Vehicle 100A runs with driving power from both motor generator 130 (MG1) and motor generator 135 (MG2).

In this case, although power storage device 100 cannot be charged as described above, similar control can be performed by replacing the driving power from engine 160 with an output from motor generator 130 in the time charts shown in FIG. 2 and the like.

The present invention is also applicable to the case where MG1 is used as a motor rather than as a generator and the vehicle runs with driving power generated by three driving sources of motor generators 130, 135 and engine 160, in the configuration of FIG. 1.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 100, 100A vehicle; 110 power storage device; 115 SMR; 120 PCU; 121 converter; 122, 123 inverter; 130, 135 motor generator; 140 power transmission gear; 150 drive wheel; 160 engine; 170, 180, 185 voltage sensor; 175 current sensor; 190 speed sensor; 300 ECU; C1, C2 capacitor; PL1, PL2, NL1 power line.

The invention claimed is:

1. A vehicle comprising:
a first driving source and a second driving source generating driving power for running the vehicle; and
a control device for controlling the first and second driving sources,
the control device causing the vehicle to run while causing continuous driving power operation to be performed on the first driving source in which the first driving source is driven to continuously generate substantially constant driving power, and causing driving power variation operation to be performed on the second driving source in which the second driving source is alternately switched between a first state where the second driving source generates driving power of a first level and a second state where the second driving source generates driving power of a level lower than the first level.

2. The vehicle according to claim 1, wherein
the control device causes the driving power variation operation to be performed on the second driving source, when driving power requested by a user varies within a prescribed range.

3. The vehicle according to claim 2, wherein
the control device causes the second driving source to be switched between the first and second states so as to maintain a speed of the vehicle within an acceptable range, while the driving power variation operation is performed on the second driving source.

4. The vehicle according to claim 3, wherein
the control device causes the second driving source to be switched to the second state in response to an increase in the speed of the vehicle to an upper limit of the acceptable range, and causes the second driving source to be switched to the first state in response to a decrease in the speed of the vehicle to a lower limit of the acceptable range.

5. The vehicle according to claim 1, wherein
a sum of the driving power generated by the first driving source and the driving power generated by the second driving source in the second state is set to be smaller than reference driving power of constant output capable of maintaining a speed of the vehicle, and
a sum of the driving power generated by the first driving source and the driving power generated by the second driving source in the first state is set to be larger than the reference driving power.

6. The vehicle according to claim 5, wherein
the vehicle runs mainly with inertial force of the vehicle when the second driving source is in the second state.

7. The vehicle according to claim 1, wherein
the driving power generated by the first driving source is set to predetermined driving power.

8. The vehicle according to claim 7, wherein
the control device causes the second driving source to stop generating the driving power when the second driving source is in the second state.

9. The vehicle according to claim 1, wherein
the first driving source is an engine, and
the second driving source is a rotating electric machine.

10. The vehicle according to claim 1, wherein
the first driving source is a rotating electric machine, and
the second driving source is an engine.

11. The vehicle according to claim 10, further comprising a power storage device for supplying electric power to the rotating electric machine, wherein
when a state of charge of the power storage device falls below a predetermined threshold value while the driving power variation operation is performed on the engine, the control device causes the continuous driving power operation of the rotating electric machine to be suspended, and causes operation to be performed in which the rotating electric machine is alternately switched between a third state where the rotating electric machine generates driving power of a second level and a fourth state where the rotating electric machine generates driving power of a level lower than the second level.

12. The vehicle according to claim 11, wherein
when the state of charge of the power storage device falls below the predetermined threshold value while the driving power variation operation is performed on the engine, the control device causes the rotating electric machine to be switched to the third state during a period when the engine is in the first state, and causes the rotating electric machine to be switched to the fourth state during a period when the engine is in the second state.

13. The vehicle according to claim 12, wherein the control device causes the rotating electric machine to stop generating the driving power when the rotating electric machine is in the fourth state.

14. The vehicle according to claim 1, wherein each of the first and second driving sources is a rotating electric machine.

15. A method of controlling a vehicle including a first driving source and a second driving source, comprising the steps of:
performing a continuos driving operation on the first driving source in which the first driving source continuously generates substantially constant driving power; and
performing a driving power variation operation on the second driving source in which the second driving source alternately switches driving power between a first state where the second driving source generates driving power of a first level and a second state where the second driving source generates driving power of a second level lower than the first level.

* * * * *